United States Patent [19]

Beuth et al.

[11] 4,305,286

[45] Dec. 15, 1981

[54] METHOD AND APPARATUS FOR MEASURING THE TEMPERATURE IN REACTORS

[75] Inventors: Paul L. Beuth; Walter Koschnitzke, both of Oberhausen, Fed. Rep. of Germany

[73] Assignee: Ruhrchemie Aktiengesellschaft, Oberhausen, Fed. Rep. of Germany

[21] Appl. No.: 123,685

[22] Filed: Feb. 22, 1980
(Under 37 CFR 1.47)

[30] Foreign Application Priority Data

Feb. 24, 1979 [DE] Fed. Rep. of Germany ....... 2907281

[51] Int. Cl.³ .............................................. G01K 1/14
[52] U.S. Cl. ................................................ 73/343 B
[58] Field of Search ........... 73/343 B, 349, 53, 61.1 R

[56] References Cited

U.S. PATENT DOCUMENTS 2,780,094 2/1957 Fink ......................................... 73/53
3,025,464 3/1962 Bond ............................. 73/61.1 R X Primary Examiner—Gerald Goldberg
Assistant Examiner—Joseph W. Roskos
Attorney, Agent, or Firm—Bierman & Bierman

[57] ABSTRACT

A method and apparatus for directly measuring the interior temperature of a pressurized reactor includes a temperature sensor movable along a measurement channel between a measurement position within the reactor and a retracted position outside the reactor, a drive system for selectively reciprocating the sensor along the channel, and a device in the channel intermediate the measurement and retracted positions for closing the channel when the sensor is at the retracted position.

15 Claims, 3 Drawing Figures

METHOD AND APPARATUS FOR MEASURING THE TEMPERATURE IN REACTORS

BACKGROUND OF THE INVENTION

In gasification plant reactors provided with outer walls formed of brickwork surrounded by a steel jacket, the brickwork is known to gradually erode as a result of the high temperatures at which the plants are operated. Unless at least a predetermined minimum thickness of the brickwork wall is maintained, the steel jacket of the reactor can be easily damaged or destroyed by overheating. As a consequence of the high sensitivity of the brickwork to temperatures that even slightly exceed permissible limits, fairly accurate measurements of the internal temperature of the reactor must be available; a maximum measurement error of 10° C. is typically important.

In oil gasification plant reactors, which are operated at temperatures of 1,000° to 1,700° C., measurement of the internal operating temperature using conventional thermocouples presents no particular difficulty. Platinum-rhodium-platinum thermocouples enclosed in a gas-tight aluminum oxide tubular jacket and further surrounded by an outer protective tube of non-gas-tight aluminum oxide have been conventionally used in that environment without major problems.

However, in coal gasification plant reactors, which operate at temperatures of 1400° C., these platinum-rhodium-platinum thermocouples have been found generally unsuitable for internal temperature measurement. Slag in the interior of the reactor tends to penetrate the protective tubes, lowering the melting point of the aluminum oxide and thereby impairing its effectiveness in sheathing the thermocouple. As a result, hydrogen and carbon monoxide come into corrosive contact with the thermocouple, at first causing false measurements and eventually destroying the thermocouple so that continued direct measurement of the internal reactor temperature becomes impossible. Like problems also occur when protective tubes formed of other ceramic materials or of high melting point metals are used.

Various alternate methods of measuring the internal operating temperature of a coal gasification reactor have been relied upon in the past. In some instances, direct temperature measurement has been passed up and the internal temperature has been indirectly measured by calculation from auxiliary operating parameters such as heat balances and gas compositions. Another "solution" has been to employ a covered thermocouple in which the normal stresses of high pressure and temperature are reduced by the use of thin, resistant ceramic protective walls, although this latter method often involves considerable measurement errors and substantial sluggishness in measurement response or reaction time for which appropriate correction factors must be estimated.

In any event, because the brickwork is so highly susceptible to considerable damage from even short term deviations from the elevated temperatures at which reactor operation is desired, employment of indirect methods for measuring internal reactor temperature presents considerable drawbacks. Direct temperature measurement is much preferred so that the accuracy of the remaining indirect measurement methods can be directly monitored on either a continuous basis or at regular, short term intervals.

It is therefore the desideratum of the present invention to provide a method and apparatus by which the internal temperature of a high temperature reactor can be directly measured over a substantial time period with a high degree of accuracy and without deterioration or destruction of the apparatus by the action of slag.

It is a further object of the invention to provide such an apparatus and method for temperature measurement which simultaneously monitors erosion of the brickwork.

SUMMARY OF THE INVENTION

An apparatus demonstrating objects and features of the present invention includes a temperature sensor formed of a thermocouple encased in a protective tube of heat-resistant material, and drive means by which the sensor can be reciprocally displaced between a retracted position exterior of the reaction space and a measurement point within the reactor. Such displacement is effected through a bore in the reactor wall, the bore being preferably inclined at an angle of 20° to 30° with respect to the wall.

A closure means through which the temperature sensor is reciprocally moveable by the drive means is operable to seal the bore when the sensor is fully withdrawn to its retracted position. A preheater is disposed adjacent the retracted position for raising the temperature of the sensor prior to insertion into the reactor space so as to minimize thermal stresses on the thermocouple and its protective tube.

Operation of the drive means for reciprocal movement of the sensor is preferably controlled by a process computer to which the measured temperature and a signal indicative of the sensor position are fed. Sensor movement is preferably effected for short periods of time at substantially regular intervals, the measured temperature being plotted by the computer for each sensing stroke as a function of measured temperature and sensor position. The resulting temperature vs. displacement graph provides a curve by which erosion of the brickwork can be derived from the curve gradient. Moreover, the feed rate for each measuring stroke of the sensor can be instantly and continually adjusted by the process computer so as to insure that the measured temperature rise per unit time does not exceed the maximum permissible alternating temperature stress rating of the thermocouple or of the material of its protective tube. The computer can also control the stroke repetition rate as well as the amount of time during which the sensor is located at both the measurement point within the reactor and at its fully retracted position.

Further objects, features and advantages of the present invention will be more fully appreciated by reference to the following detailed description of a presently preferred, but nonetheless illustrative, embodiment in accordance with the present invention when taken in conjunction with the accompanying drawing.

In the drawing, wherein similar reference characters denote similar elements throughout the several views.

DETAILED DESCRIPTION OF THE PREFERRED EMBODIMENT

Figure 1:
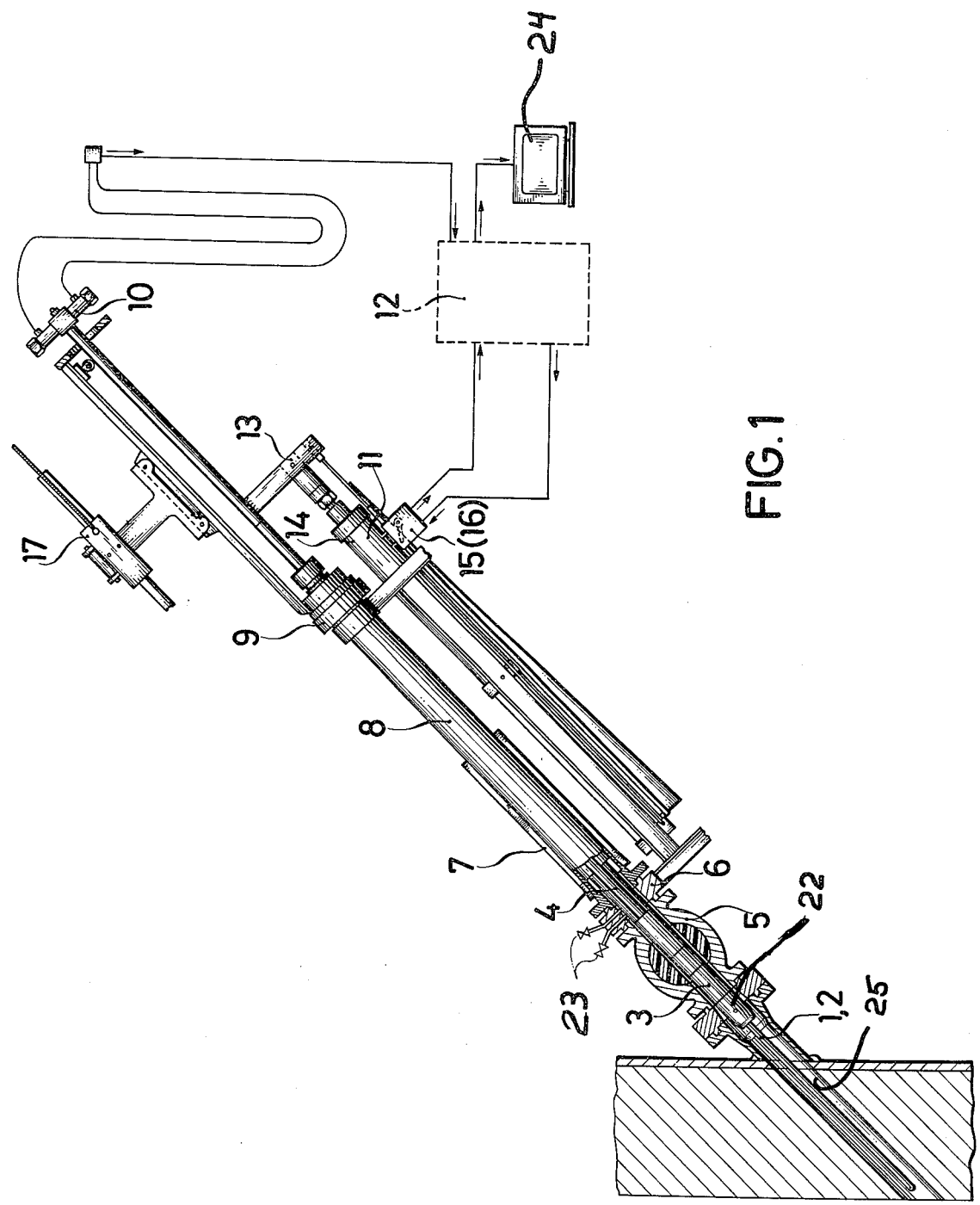
FIG. 1 is an elevated side view, partially in section, of a temperature measuring apparatus constructed in accordance with the teaching of the invention and disposed in operating conjunction with a wall of a reactor.
Figure 2:
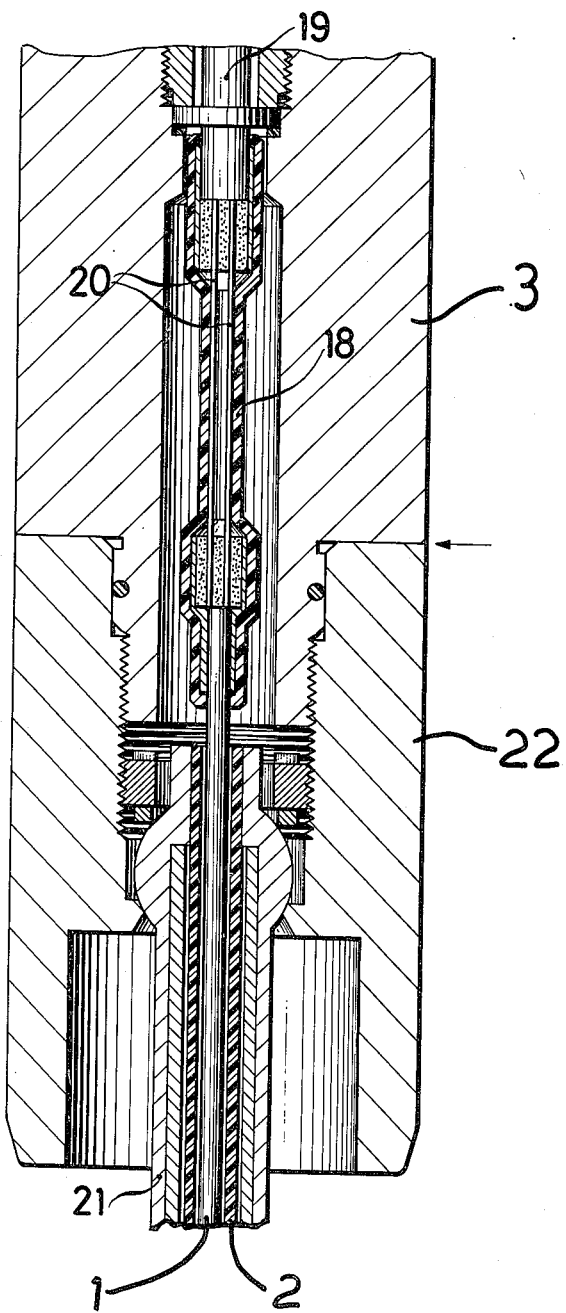
FIG. 2 is a sectional side view, partially broken away, of a replaceable temperature sensor unit according to the invention.

Turning now to the drawing, there is shown in FIGS. 1 and 2 a preferred apparatus for directly measuring the internal temperature of a high temperature reactor, and more particularly of a reactor operated at elevated pressure and at temperatures above 1400° C. An elongated temperature sensor 1 includes a thermocouple having a protective tube 2 of a heat-resistant material such as ceramic. The protective tube 2 is cylindrically journalled or otherwise secured within the spherically-configured mount portion of a supporting tube 21 which reinforcingly surrounds the tube 2 along its length. The supporting tube 21 is formed of a metal having a sufficiently high melting point and is intended to prevent undesired bending or like deformation of the protective tube 2 as a result of its own weight. Such deformation might otherwise cause the sensor 1 to come into contact with slag that has penetrated the bore 25 defined in the reactor wall and through which the temperature sensor 1 is moveable in a manner soon to be described. In a well-known construction, the reactor wall comprises a predetermined thickness of brickwork enveloped by a steel jacket.

The spherical mounting of the supporting tube 21—and accordingly of the protective tube 2 journalled therein—enables the tip of the temperature sensor 1 to adequately adapt to thermal expansions of the brickwork. In addition, an inert atmosphere of nitrogen gas is flushed along the exterior surface of the supporting tube 21 for the purpose of protecting the metallic composition of the tube 21 from the corrosive effects of the interior reactor atmosphere.

The temperature sensor 1 is reciprocally moveable along its longitudinal axis through a passage in closed communication with the reactor wall bore 25 and including a closure means 5. The passage and the reactor bore 25 together define a measurement channel extending from an upstream-designated end at the bore 25 to a downstream-designated position exterior of the reaction chamber or space. The closure means 5 is operable for closing its internal through-passage and thereby sealing the bore 25 and reactor interior against the external or ambient atmosphere. However, operative closure of the means 5 can be effected only when the temperature sensor 1 is fully retracted from its predetermined measurement point or position in the interior of the reactor space. The closure means 5 may, by way of example, be implemented utilizing a spherical stopcock.

It is intended that the temperature sensor 1, together with the entire temperature sensor unit 22, be easily replaceable as and when necessary, and, for this purpose, a quick-change unit 3 is provided. Since operation of the closure means 5 is effective to seal the pressurized interior reaction chamber from that portion of the inventive apparatus in which the sensor is positioned in its fully retracted position, removal and replacement of the sensor 1 can be carried out even during reactor operation.

The quick-change unit 3 is provided with an internal connector for the thermocouple connection leads 20. The leads 20 pass through a sealing duct 19 which separates the high pressure environment of the reactor from the external atmosphere. Spherical mounting of the duct 19 requires that the thermocouple connecting leads 20 in the region of the reaction atmosphere be flexible. However, it has been noted that condensed vapor in this region can cause short circuits between the leads 20. In order to eliminate this problem, the connecting leads or wires 20 upstream of the duct 19 are protected by sealing the insulating-transition points of the leads 20 in sleeve-type sealing compound carriers and by covering the length of the leads 20 exposed to the reaction atmosphere with an insulative shrinkdown tube 18 of a suitable material. Downstream of the duct 19, the thermocouple leads 20 are protectively passed through a tubular body 4.

A device 6 for flushing the sensor-movement passage or measurement channel with inert gasses—as, for example, nitrogen—and for releasing the pressure downstream of the closure means 5 to enable monitoring of the internal reactor pressure, is provided downstream of the means 5. The flushing device 6 is particularly effective for pressurizing that portion of the measurement channel downstream of the closure means 5—i.e., at the retracted position of the temperature sensor—when the means 5 is fully closed. By placing the downstream measurement channel at a pressure higher than that prevailing in the reactor while the temperature sensor is disposed in its fully retracted position, hot reactor gas is prevented from entering the wall bore 25 and flowing up into the measurement channel when the closure means 5 is subsequentally opened to enable the sensor 1 to be moved to its measurement point in the reaction space. Accordingly, the closure means 5 is arranged so that its interior passage can be opened only when the downstream channel inert gas pressure is no less than a predetermined minimum value.

In the event of a failure of the inert gas flushing system or device 6 together with the simultaneous occurrence of system leakage, hot gas flowing into the measurement channel from the reactor could damage the apparatus of the invention. The provision of a temperature monitoring device 23 insures that the sensor 1 is withdrawn and that the closure means 5 seals the downstream passage from the hot reaction gasses before a critical stage is reached.

When the temperature sensor 1 is moved from its fully retracted position (downstream of the closure means 5) into the interior reaction space, extremely rapid or abrupt changes in its temperature can cause structurally-unacceptable thermal stresses to the sensor. To avoid such damage, the sensor tip can be initially preheated by means of a heating unit 7 disposed at or adjacent the sensor's retracted position. The heating device 7, which may be electrically powered, is seen in FIG. 1 to encircle a tubular body 8 which defines the downstream measurement channel.

The inventive apparatus is further provided with a quick-change device 9 which allows for removal of the complete temperature sensor unit 22 together with the bearing and stuffing box unit. The stuffing box is provided with a safety chamber for preventing the escape of gases from the interior of the downstream measurement channel and which is maintained under an inert gas pressure. Occurrences of gas leakage are detectable by measuring the flow rate of the inert gas stream. The quick-change device 9 is structurally arranged so that it can be actuated for removal of the sensor unit only when the closure means 5 isolatingly seals the downstream measurement channel from the reactor bore 25 and the interior of the tubular body 8 is unpressurized.

Reciprocating movement of the temperature sensor 1 along the measurement channel is effected by way of a drive means 11 which may be implemented utilizing a pneumatic, hydraulic, electrical, or other type servo drive system. The servo system includes a drive piston 14, a stroke position regulator 15, and a stroke position indicator 16 arranged behind the regulator 15 and including a feedback device. A quick-connection unit 13 enables the power connection between the servo drive and the reciprocatable sensor-supporting apparatus to be released and reconnected rapidly and without substantial difficulty.

A process computer 12 controls the operation of the drive means 11 and receives its input signals from the stroke position regulator 15 and indicator 16 and from the thermocouple extension leads 20 at a connecting head 10 provided with pressure-resistant ducts. The computer 12 feeds output signals to a screen 24 for graphically representing the temperature profile of the measurement stroke and for numerically or otherwise indicating received and calculated data such as existing brickwork thickness, optimum measuring cycle frequency, inter-measurement interval time, maximum drive rate when using a newly installed thermometer or sensor under reactor operating conditions, actual measured temperature, and last-measured maximum temperature. Naturally, the display of other data useful to those monitoring the reactor is well within the contemplation of the present invention.

Unitary removal of the thermometer apparatus of the invention, in its entirety, can be carried out by disconnection at removal means 17.

The temperature sensor 1 is reciprocally moveable or displaceable along its longitudinal access through the reactor wall bore 25 between a measurement point within the reaction space and a fully retracted position behind or downstream of the closure means 5. Under the control of the process computer 12, the tip of the sensor 1 is exposed to the critical operating conditions within the reactor for periods not exceeding its ability to withstand the elevated temperatures and pressures of normal reactor operation. The drive means 11 is operable to enable the sensor 1 to adopt any arbitrary position along the measurement channel or within the reaction chamber and the sensor can also be completely withdrawn from contact with the pressurized reaction atmosphere by moving the same downstream or behind the closure means 5. It is therefore possible, by operatively closing the means 5, to isolate the temperature measuring device from the pressurized reaction atmosphere so as to enable facilitated replacement of the sensor 1 during uninterrupted reactor operation.

It is particularly important that the temperature sensor 1 be prevented from coming into direct contact with slag in the interior reaction space. It has been found advantageous, insofar as preventing such contact, to incline the bore 25 in the reactor wall at a preferred angle of 20 to 30 degrees with respect to the wall. In so disposing the temperature sensor 1 for movement into the reactor through the bore 25 at the preferred angle, and by providing the device 6 for flushing the measurement channel with inert gases and for releasing the pressure therein, the possibility of contact between the tip of the temperature sensor 1 and slag is significantly minimized.

Figure 3:
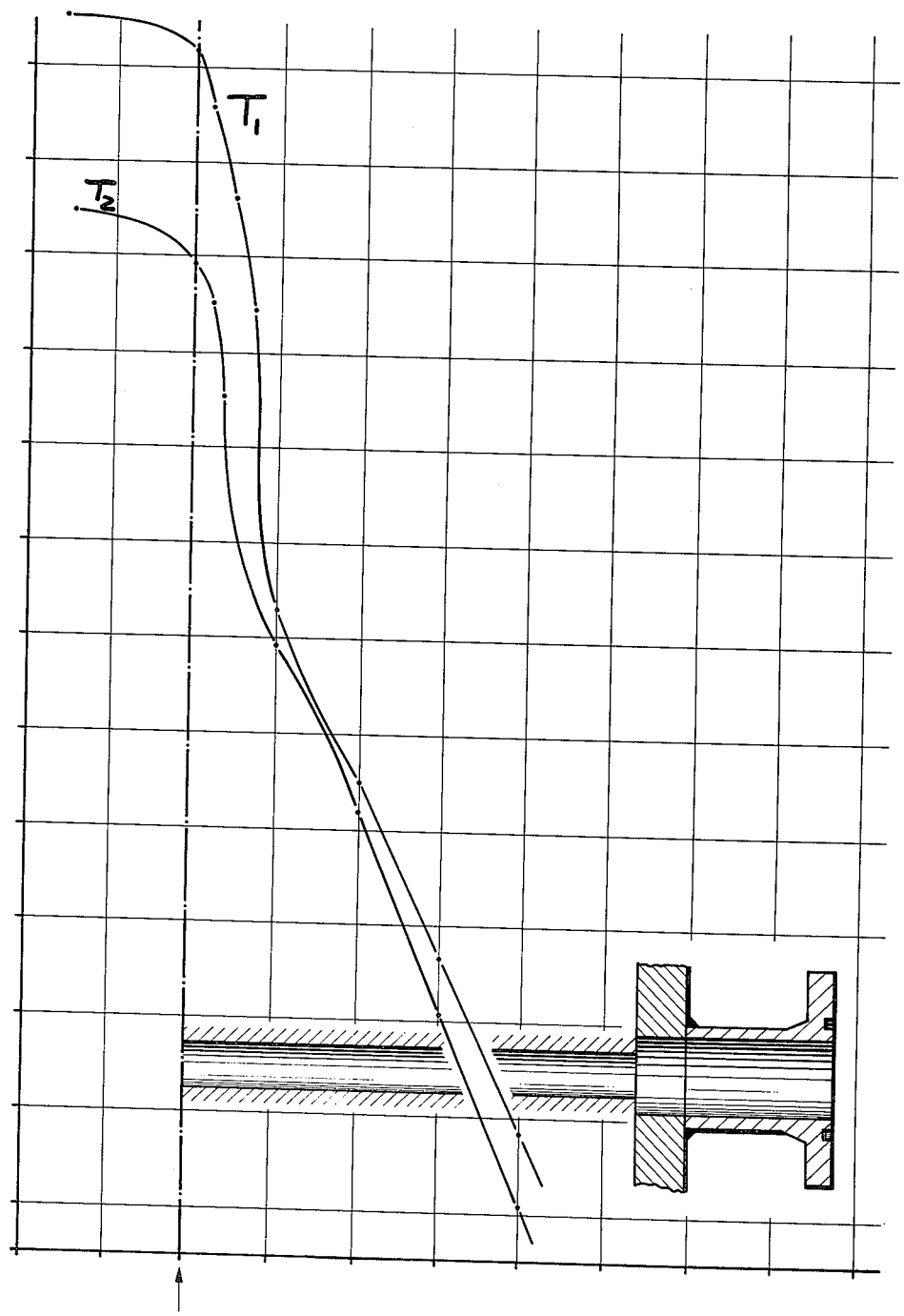
FIG. 3 is a graphical representation of typical temperature vs. displacement curves produced by the apparatus and method of the present invention.

The control computer 12 processes the measurement values recorded by the temperature sensor 1 and, by way of a localized feedback arrangement, the computer is continually updated with information on the position of the sensor 1 along its measurement stroke. From this data, a graphical representation of directly measured temperature as a function of instantaneous stroke length or position can be provided on the output screen 12. Two typical curves provided in this manner and labelled $T_1$ and $T_2$ are shown in FIG. 3 wherein the vertical axis represents increasing temperature and the horizontal axis represents stroke position or sensor displacement along the measurement channel. In FIG. 3, the intersection of the axes delineates the measurement point in the reaction chamber.

From the resulting curve, the process computer 12 can determine the optimum measurement position within the reactor interior. Moreover, the transition points as the sensor moves from the restricted bore 25 to the open, internal reaction chamber can be derived from the gradient of the curve so as to determine the amount of brickwork erosion that has occurred. The vertical broken line in FIG. 3 to the right of the temperature axis and indicated by the reference arrow represents the interior edge location of the brickwork at the transition point as determined from the curves shown. By comparing the several curves plotted from a series of time-spaced temperature measurement strokes, the rate of such erosion can also be found. Thus, the method and apparatus of the present invention enables the amount and the rate of brickwork erosion to be readily determined during continued and uninterrupted operation of the reactor.

The process computer 12 is also intended to automatically and instantaneously adjust the feed rate for each measuring stroke on a continuing basis so as to avoid exceeding the rate of temperature change which can be tolerated by the thermal stress characteristics of the material of the sensor 1—and particularly of the protective tube 2. Control of the measurement cycle as well as of the period during which the sensor 1 remains in either the measurement or fully retracted positions is likewise contemplated.

It should be further noted that the temperature measured by the sensor 1 in its fully retracted position provides information useful in the inventive method and apparatus. The process computer 12 can, at an adjustable limiting value of the rate of temperature change, cause a new measuring stroke to be initiated based upon the sensed temperature in the retracted position.

Although it is intended that direct temperature measurement by way of the apparatus and method of the invention be sufficient for maintaining control of the internal operating parameters of the reactor, it is recognized that parallel and simultaneous temperature measurement utilizing enclosed thermometers and indirectly by way of calculation and extrapolation of auxiliary operating variables such as heat balance and gas composition analyses can provide secondary monitoring capabilities. By concurrently providing both direct and indirect temperature measurement, the operating lifetime of the temperature sensor 1 can be extended since it will preferably be positioned for the greater part of the time in its fully retracted position. The sensor is intended to be displaced into the reaction space for direct temperature measurement for only brief periods. Between succeeding reciprocated displacements to the measurement position, indirect techniques can be utilized for continuous monitoring of the internal reactor conditions while the present inventive apparatus provides a verification or check on the reliability and accuracy of the indirect data obtained. The periodic direct measurement strokes of the invention further provide information with respect to erosion of the brickwork comprising at least a portion of the reactor wall.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is intended, therefore, to be restricted only as limited by the scope of the claims appended hereto.

What is claimed is:

1. An apparatus for measuring temperature in a reactor having a bore in the reactor wall through which temperature measurements are made and operated at elevated pressure and at temperatures above 1400° C., said apparatus comprising:
   a temperature sensor including a thermocouple fully enclosed within an outer tube formed at least in part of a heat-resistant material for protecting said thermocouple;
   drive means for reciprocating said temperature sensor axially through the reactor bore between a measurement position within the reactor and a retracted position exterior of the reactor wall; and
   closure means including a passage in communication with the bore and through which said temperature sensor is reciprocally moveable by said drive means between said measurement and retracted positions, said closure means being operable to close said passage for sealing the reactor bore when said temperature sensor is withdrawn from said measurement position to said retracted position so that said sensor is isolated from the interior reaction atmosphere.

2. An apparatus according to claim 1 wherein said temperature sensor is disposed for movement into the reactor through the bore at an angle of between 20 and 30 degrees with respect to the reactor wall.

3. An apparatus according to claim 1 wherein said outer tube of the temperature sensor is reinforced with a fully enclosing metal support tube.

4. An apparatus according to claim 1 and further comprising means at the retracted position of said temperature sensor for pre-heating the sensor prior to its being moved to said measurement position within the reactor.

5. An apparatus according to claims 1 or 4 wherein said temperature sensor includes flexible connections to said thermocouple and further comprising shrinkdown tubing protectively surrounding portions of said flexible connections exposed to the pressurized reaction atmosphere.

6. An apparatus according to claim 5, said outer protective tube being spherically mounted in said temperature sensor.

7. An apparatus according to claim 1 and further comprising computer means connected to said temperature sensor and said drive means for controlling said reciprocating movement of said temperature sensor between said measurement and retracted positions on the basis of the measured temperature and the position of said temperature sensor along its path of reciprocating movement.

8. An apparatus according to claim 7, said computer means further basing control of the movement of said temperature sensor on the rate of measured temperature change as said sensor is reciprocally moved.

9. A method of directly measuring the temperature in an elevated pressure reactor, comprising the steps of:
   selectively reciprocating a temperature sensor between a measurement position at the reactor interior and a fully retracted position exterior of the reactor, the measurement and retracted positions comprising opposite ends of a sealed measurement channel which includes a bore through the reactor wall; and
   alternately closing the measurement channel intermediate its ends when the temperature sensor is in its retracted position so as to isolate the sensor from the interior operating atmosphere of the reactor, and opening the measurement channel for at least one fully reciprocated movement of the temperature sensor along the channel for directly measuring the internal reactor operating temperature;
   said selective reciprocating movement of the temperature sensor being controlled by a process computer controlling the rate of sensor movement along the measurement channel based upon the temperature sensed by the sensor and the position of the sensor along the measurement channel.

10. A method according to claim 9 wherein the process computer further controls the time between successive temperature-measuring movements of the sensor along the channel from the fully retracted position.

11. A method according to claim 9, the process computer further controlling the time period during which the sensor remains in the measurement position.

12. A method according to claim 9, the process computer further controlling the distance along the channel toward the measurement position that the temperature sensor is moved from its fully retracted position for determining reactor internal operating temperature.

13. A method according to claim 9 in which the reactor includes a wall at least partially formed of a predetermined depth of brickwork and comprising the further step of:
   determining the amount of erosion in the depth of the brickwork by analysis in the process computer based upon the rate of change in the measured temperature as the temperature sensor is moved along the measurement channel between the reactor wall bore and the measurement position at a selected rate.

14. A method of directly measuring the temperature in an elevated pressure reactor, comprising the steps of:
   selectively reciprocating a temperature sensor between a measurement position at the reactor interior and a fully retracted position exterior of the reactor, the measurement and retracted positions comprising opposite ends of a sealed measurement channel which includes a bore through the reactor wall;
   alternately closing the measurement channel intermediate its ends when the temperature sensor is in its retracted position so as to isolate the sensor from the interior operating atmosphere of the reactor, and opening the measurement channel for at least one fully reciprocated movement of the temperature sensor along the channel for directly measuring the internal reactor operating temperature; and
   pressurizing the measurement channel at the retracted position with the channel closed intermediate its ends and the temperature sensor disposed at the fully retracted position to a pressure at least as great as that existing in the reaction space so that when the channel is subsequently opened for reciprocated temperature measurement movement of the sensor from the retracted position, reaction byproducts in the reaction space are not drawn into the channel.

15. In a reactor wherein the interior temperature is indirectly measured on a continuous basis by calculating the interior temperature from selected operating characteristics of the reactor, a method of periodically verifying the accuracy and reliability of the indirect temperature measurements by direct measurement of the interior temperature utilizing an apparatus which includes a temperature sensor comprising a thermocouple enveloped in a heat-resistant protective material, drive means for reciprocally moving the sensor along a measurement channel between a measurement position within the reactor and a retracted position exterior of the reactor, closure means for closing the measurement channel intermediate its ends when the sensor is in the retracted position so as to isolate the sensor from the reaction atmosphere, and a process computer controlling the drive means for selective movement of the temperature sensor along the measurement channel, the method comprising:

normally maintaining the temperature sensor in the retracted position with the closure means closing the measurement channel, periodically operating the closure means to open the measurement channel, and selectively reciprocating the temperature sensor from the retracted position to the measurement position under computer control while the closure means opens the channel for directly measuring the instantaneous internal reactor temperature, and then returning the sensor from the measurement position to the retracted position and operating the closure means to close the channel and isolate the sensor from the interior reaction atmosphere.

* * * * *